Figure 1:
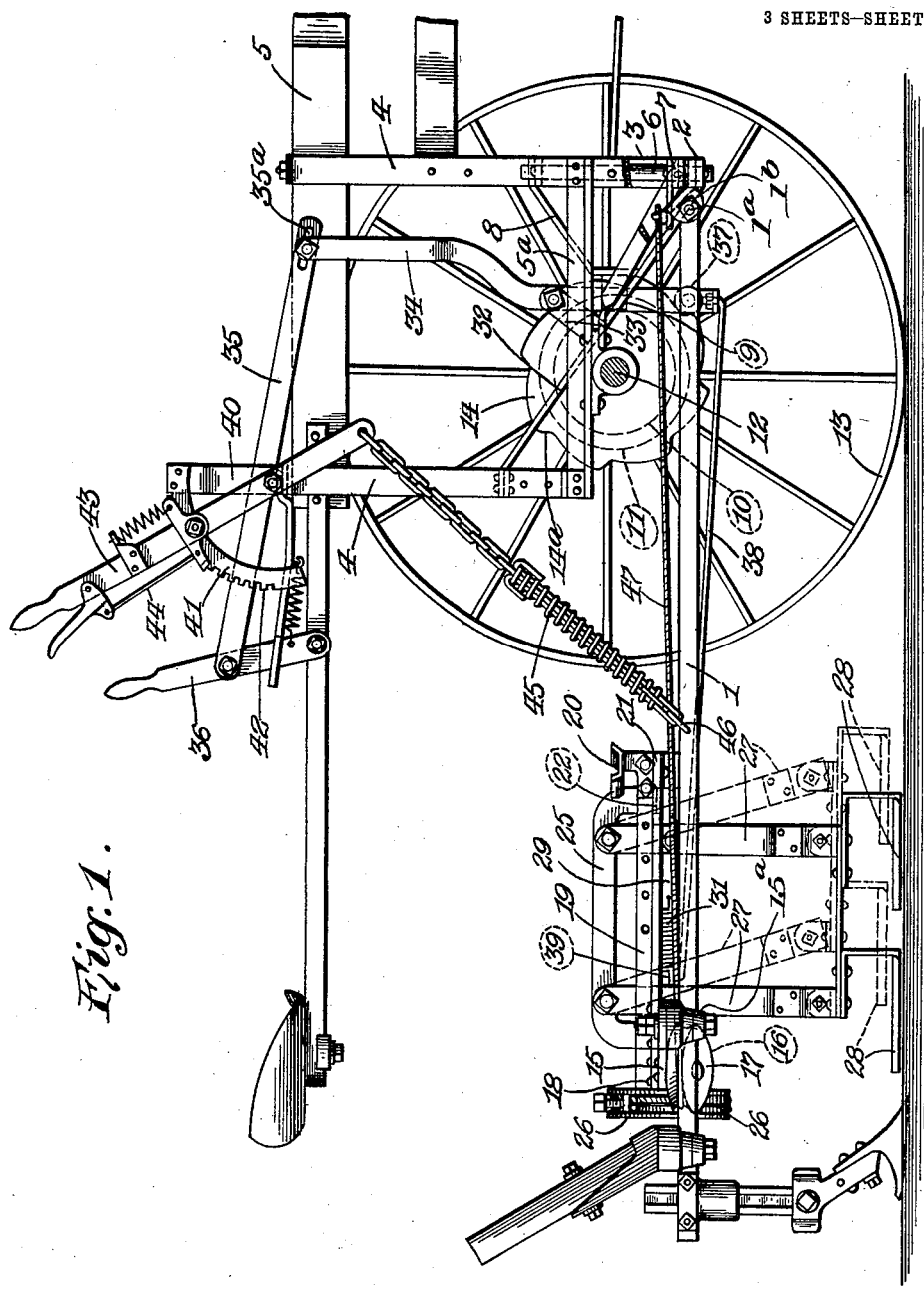

T. H. ELLIS.
COTTON CHOPPER.
APPLICATION FILED DEC. 11, 1911.

1,069,324.

Patented Aug. 5, 1913.
3 SHEETS—SHEET 3.

Witnesses:
Chas. A. Becker,
Laura A. Schmalz.

Inventor:
Thomas H. Ellis,
By Small & Small
His Attorneys.

UNITED STATES PATENT OFFICE.

THOMAS H. ELLIS, OF ST. LOUIS, MISSOURI, ASSIGNOR TO NATIONAL SPECIALTY AND DEVELOPMENT COMPANY, OF ST. LOUIS, MISSOURI.

COTTON-CHOPPER.

1,069,324.  Specification of Letters Patent.  Patented Aug. 5, 1913.

Application filed December 11, 1911. Serial No. 665,184.

*To all whom it may concern:*

Be it known that I, THOMAS H. ELLIS, a citizen of the United States, residing at St. Louis, in the State of Missouri, have invented a new and useful Cotton-Chopper, of which the following is a specification.

This invention relates to improvements in cotton-choppers, more particularly those shown in my Patents Nos. 913,115 and 954,566, and consists in the novel construction and arrangement of parts as hereinafter shown and described.

The prime object of this invention is to provide a device of the character described in which the chopping hoe (which may hereinafter be referred to as the chopping blades) is so mounted and actuated as to reciprocate transversely across a row of plants as the implement carrying said device proceeds along the length of said row.

A further object is to provide a cotton chopper in the form of an attachment which may be applied to the frame of the usual type of cultivator and thus effect a combined implement by means of which the crop may be simultaneously "chopped out" and cultivated.

A further object is to provide a simple and effective mechanism for raising the chopping blades off the ground where the plants are found not to require thinning out.

A still further object lies in imparting to the chopping blades a motion adapted to prevent the accumulation thereon of plant growth or refuse which may be encountered in the field.

Other objects and advantages will be apparent from a consideration of the following portions of this specification and will be particularly pointed out in the appended claims.

By providing an implement wherein the chopping blades constituting the hoe reciprocate at substantially a right angle to the row over which the implement is passing, it follows that the standing plants coming in the path of said blades are cut out in blocks, while the soil around the plants removed from said path remains undisturbed. Upon further consideration of this invention it will be appreciated that when the chopping blades are actually engaged in thinning out the row they do not move forward with the implement to which this device may be applied, but after a cutting stroke is completed said blades are moved in a forward direction at a rate of speed greater than that at which said implement is moving, thus compensating for the forward movement lost by them during the thinning out operation. It will also be noted that the peculiar movement of the hoe or chopping blades, coupled with the novel form thereof, not only prevents the adherence to the mechanism of plant growth but acts to evenly divide and distribute the soil on both sides of the row, whereby the crop is left in most favorable condition to be worked or cultivated.

Figure 2:
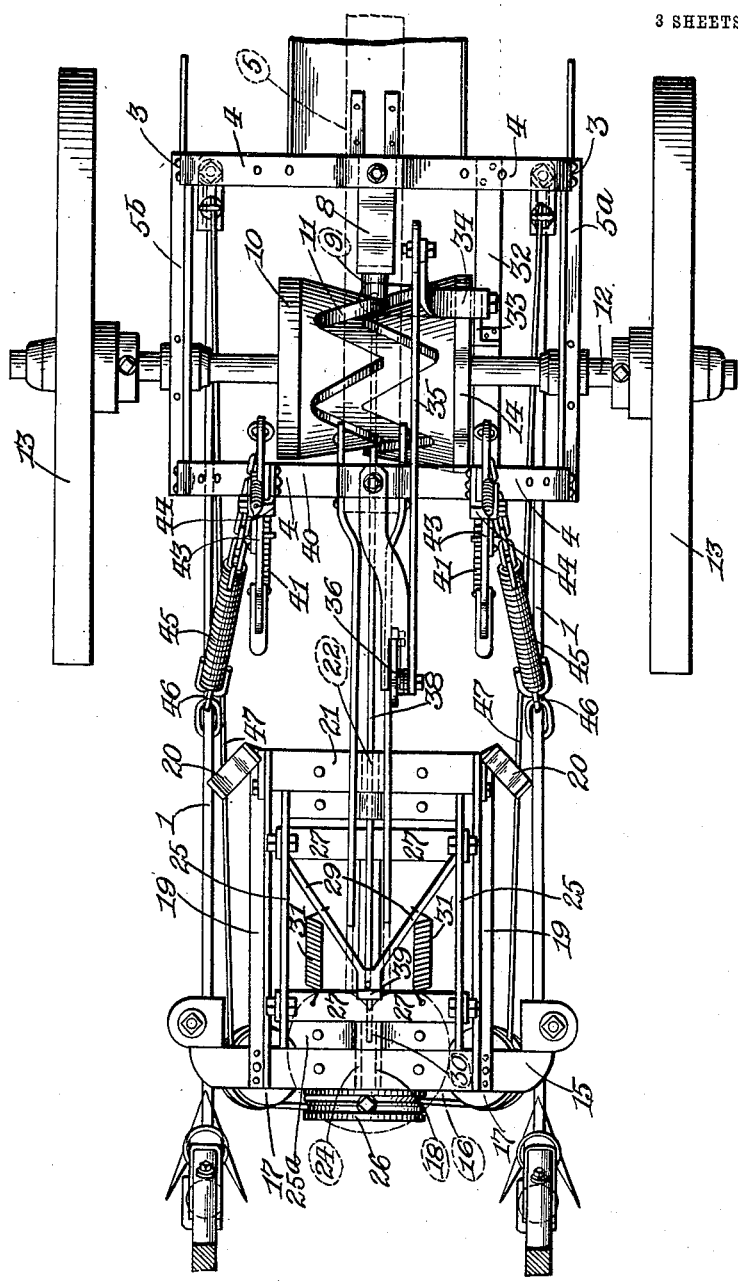
Figure 3:
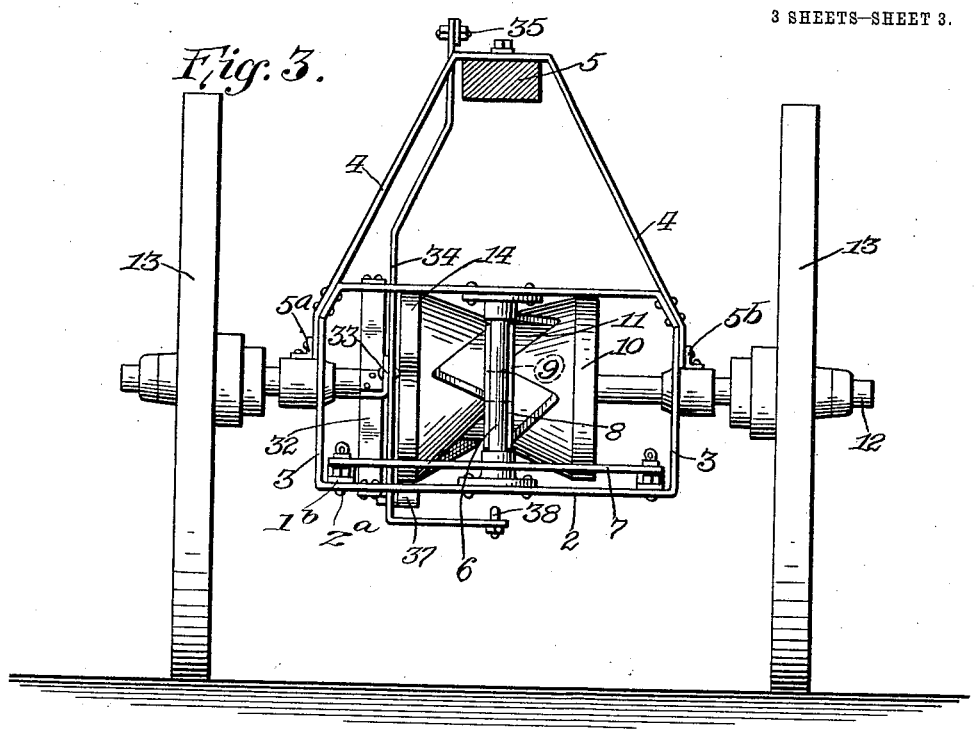
Figure 4:
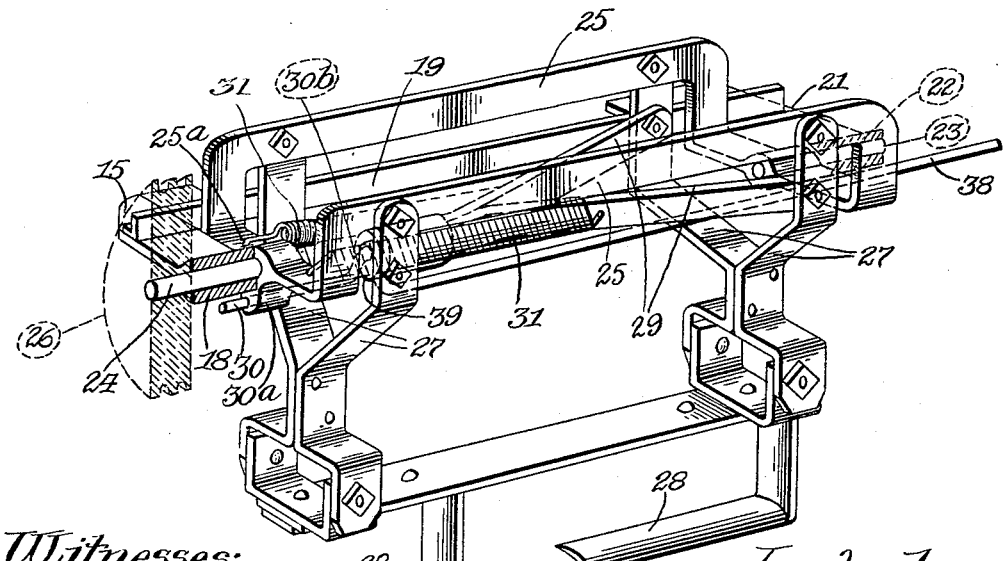

In the accompanying drawings, in which like numerals refer to like parts throughout the several views, Figure 1 is a side elevation of an implement having my device attached thereto; Fig. 2 a top plan view of the implement of Fig. 1; Fig. 3 an end elevation of said implement; and Fig. 4 a perspective designed to illustrate, on slightly enlarged scale, the details of construction of the hoe and parts immediately adjacent thereto.

Referring particularly to Figs. 1 and 3 of the drawings forming part of this specification, the forward ends of side-bars 1 are hingedly connected (for vertical movement) at $1^a$ with angular members $1^b$ which are pivotally secured (for lateral movement) to a plate 2 through the agency of pins $2^a$, said plate being prolonged into vertically disposed members 3 which are rigidly secured to opposite extremities of a bracket 4, the same supporting a wagon-tongue 5 and being suitably affixed to angle-irons $5^a$, $5^b$. Movably retained in bearings supported by plate 2 and bracket 4 is a vertical shaft 6 to the lower extremity of which is secured a horizontally disposed beam 7, and there is also mounted upon said shaft a V-shaped frame 8 provided intermediate its ends with a roller 9 designed to contact with the sides of a zig-zag groove 10 sunk in the face of a drum 11. Said drum is mounted centrally of an axle 12 which connects traction wheels 13, and to one end thereof is secured a cam-disk 14 especially contrived to impart to other mechanism certain important movements hereinafter described. Detachably secured to the opposite extremities of plate 15 are revoluble members $15^a$ through which are directed bars 1 and centrally disposed in said plate, from whose under surface depends a curved brace 16 carrying sheaves 17, is a bearing 18, plate 15 being suspended from and rigidly secured to parallel beams 19 whose forward ends, carrying stirrups 20, are connected by a plate 21. Plate 21 supports a bearing 22 in alinement with bearing 18, and in said bearings are journaled stub-shafts 23, 24 prolonged from hoe-carriage 25, a sheave 26 provided with peripheral channels being keyed upon the extremity of shaft 24.

Pivotally suspended from carriage 25 are forked arms 27 to whose lower ends are hingedly secured L-shaped chopping blades 28 constituting hoes, and disposed between said arms and hingedly secured to the forward one thereof is a Y-shaped member 29 whose rear extremity is prolonged into a comparatively slender rod 30 which is slidably mounted in an eyelet 30ª. The opposite extremities of coil springs 31 connect the forward portions of member 29 with frame member 25ª. Near the front of the implement a brace 32 is arranged to which is affixed a standard 33 and upon said standard is fulcrumed an arm 34 whose upper end is connected by a link 35 having a slot 35ª to a lever 36, while to the lower end of said arm is secured a roller 37 designed to follow the face of cam 14. A rod 38 extends rearwardly from the portion of arm 34 carrying roller 37 and terminates in a loop 39 closely surrounding rod 30, the latter being sharply depressed as at 30ᵇ to lock said loop in position. Fixed to opposite extremities of a bracket 40 secured to tongue 5 are gear segments 41 having peripheral teeth 42 and fulcrumed upon said bracket at a point below said segments are levers 43 provided with spring-pawls 44, levers 43 being connected with bars 1 through flexible links 45 hooked in eyelets 46. The opposite ends of beam 7 are connected by a cord or cable 47 which passes over sheaves 17 and is wound upon sheave 26 in such manner as to effect reciprocal movement of the same responsive to the movement of beam 7.

The operation of the device is as follows: As the implement is drawn along a row the plows carried by side bars 1 operate on both sides of the row in the usual manner. As traction wheels 13 rotate axle 12, drum 11, and cam-disk 14 revolve in unison therewith, and the contact of roller 9 of frame 8 with groove 10 of said drum acts to impart reciprocal movement to shaft 6 and beam 7 secured thereto. This movement of beam 7, whereby one of its arms is swung outwardly while the other is swung inwardly, is transmitted by cable 47 to rotate sheave 26 alternately in opposite directions, and there is thus imparted to hoe carriage 25 an oscillatory movement. Thus as the implement proceeds along a row of plants chopping blades 28 are reciprocated, in response to said movement of the carriage from which they are pivotally suspended, transversely across said row and at each reciprocation chop out a block of vegetation. As drum 11 revolves roller 37 is moved alternately forward and rearward as it follows the contour of cam 14 and the arrangement of parts is such that said roller rides one of the projections of said cam simultaneously with the completion of the transverse movement of blades 28 and thus brings them forward, through the medium of rod 38, at a rate of speed greater than that at which the implement is moving. Upon completion of the forward movement of the hoe blades, just described, roller 37 begins to traverse one of the inclined edges 14ª of cam 14 and in this manner, through the coöperation of springs 31, arms 27 are drawn rearward during the cutting stroke of said blades at substantially the same rate of speed as the forward movement of the implement as an entirety.

The adjustment of the blades relative to the ground over which the implement is passing may be effected through the use of levers 43 which are adapted to raise or lower the entire rear portion of the machine, and where the plants are found not to require thinning the chopping blades alone may be raised out of contact with the ground by bringing forward rod 38 through operation of lever 36. It will also be noted that lever 36 has an added function in that it may be used to disengage roller 37 and cam 14, thus effecting a cessation in the forward movement of blades 28 described in the preceding paragraph. Moreover, the operator when riding upon the implement may place his feet in stirrups 20 and move the entire lower mechanism as a unit laterally to an extent sufficient to compensate for any excessive irregularity in the line of travel of wheels 13.

Though the preferred form of my invention is herein described, the right is reserved of making such change in the size, arrangement and construction of the various parts as may, from time to time, prove expedient or desirable and without departing from the spirit of the invention and the scope of the following claims.

What I claim as new and desire to secure by Letters-Patent is:—

1. An agricultural implement comprising a frame, a carriage revolubly suspended from said frame, and cutting blades hingedly connected with said carriage, means for laterally reciprocating said carriage, and mechanism automatically advancing said blades at the termination of each reciprocation of said carriage, said mechanism adapted to effect said advancement at a rate of speed in excess of that at which said implement is moving.

2. An agricultural implement comprising a frame, a carriage revolubly suspended from said frame, and cutting blades hingedly connected with said carriage, means for laterally reciprocating said carriage, mechanism automatically advancing said blades at the termination of each reciprocation of said carriage, and devices for rearwardly moving said blades during said reciprocation, said mechanism adapted to effect said advancement at a rate of speed in excess of that at which said implement is moving, and said devices adapted to effect said rearward movement of said blades at substantially the same rate of speed as the forward movement of said implement.

3. Motion-imparting mechanism comprising a revoluble member, a guide-way disposed therein, a device adapted to follow said guide-way, a beam connected with said device, a sheave, and members connecting said beam and sheave, said guide-way adapted to reciprocate said device, said device adapted to reciprocate said beam, and said members adapted to impart the movement of said beam to said sheave.

4. Motion-imparting mechanism comprising a revoluble member, a guide-way disposed therein, a device adapted to follow said guide-way, a beam connected with said device, a sheave, and members connecting said beam and sheave, said guide-way adapted to horizontally reciprocate said device, said device adapted to reciprocate said beam, and said members adapted to impart the movement of said beam to said sheave.

5. An agricultural implement comprising a frame, a carriage revolubly suspended from said frame, cutting blades connected with said carriage, a revoluble member, a guide-way disposed therein, a device adapted to follow said guide-way, a beam connected with said device, a sheave connected with said carriage, and members connecting said beam and sheave, said guide-way adapted to reciprocate said device, said device adapted to reciprocate said beam, and said members adapted to impart the movement of said beam to said sheave.

6. An agricultural implement comprising a frame, a carriage revolubly suspended from said frame, cutting blades hingedly connected with said carriage, a revoluble member, a guide-way disposed therein, a device adapted to follow said guide-way, a beam connected with said device, a sheave connected with said carriage, and members connecting said beam and sheave, said guide-way adapted to reciprocate said device, said device adapted to reciprocate said beam, and said members adapted to impart the movement of said beam to said sheave.

7. An agricultural implement comprising a frame, a carriage revolubly suspended from said frame, cutting blades connected with said carriage, a revoluble member, a guide-way disposed therein, a device adapted to follow said guide-way, a beam connected with said device, a sheave connected with said carriage, members connecting said beam and sheave, and means for raising said blades out of contact with the ground, said guide-way adapted to reciprocate said device, said device adapted to reciprocate said beam, and said members adapted to impart the movement of said beam to said sheave.

8. An agricultural implement comprising a frame, a carriage revolubly suspended from said frame, cutting blades hingedly connected with said carriage, a revoluble member, a guide-way disposed therein, a device adapted to follow said guide-way, a beam connected with said device, a sheave connected with said carriage, members connecting said beam and sheave, and means for raising said blades out of contact with the ground, said guide-way adapted to reciprocate said device, said device adapted to reciprocate said beam, and said members adapted to impart the movement of said beam to said sheave.

9. Motion-imparting mechanism comprising a revoluble member, a guide-way disposed therein, a cam, a device adapted to follow said guide-way, a beam connected with said device, a sheave, members connecting said beam and sheave, an arm normally retained in engagement with said cam, and a rod secured to said arm, said guide-way adapted to reciprocate said device, said device adapted to reciprocate said beam, said members adapted to impart the movement of said beam to said sheave, said cam adapted to advance said arm at the termination of each reciprocation of said beam, and means to retract said rod.

10. Motion-imparting mechanism comprising a revoluble member, a guide-way disposed therein, a cam, a device adapted to follow said guide-way, a beam connected with said device, a sheave, members connecting said beam and sheave, an arm normally retained in engagement with said cam, and a rod secured to said arm, said guide-way adapted to reciprocate said device, said device adapted to reciprocate said beam, said members adapted to impart the movement of said beam to said sheave, said cam adapted to advance said arm at the termination of each reciprocation of said beam, means to retract said rod, and mechanism for disengaging said arm and cam.

11. An agricultural implement comprising a frame, a carriage revolubly suspended from said frame, cutting blades connected with said carriage, a revoluble member, a guide-way disposed therein, a cam, a device adapted to follow said guide-way, a beam connected with said device, a sheave connected with said carriage, members connecting said beam and sheave, an arm normally retained in engagement with said cam, and a rod connecting said arm and blades, said guide-way adapted to reciprocate said device, said device adapted to reciprocate said beam, said members adapted to impart the movement of said beam to said sheave, said cam adapted to periodically advance said blades, and means to retract said blades.

12. An agricultural implement comprising a frame, a carriage revolubly suspended from said frame, cutting blades hingedly connected with said carriage, a revoluble member, a guide-way disposed therein, a cam, a device adapted to follow said guide-way, a beam connected with said device, a sheave connected with said carriage, members connecting said beam and sheave, an arm normally retained in engagement with said cam, and a rod connecting said arm and blades, said guide-way adapted to reciprocate said device, said device adapted to reciprocate said beam, said members adapted to impart the movement of said beam to said sheave, said cam adapted to periodically advance said blades and means to retract said blades.

13. An agricultural implement comprising a frame, a carriage revolubly suspended from said frame, cutting blades connected with said carriage, a revoluble member, a guide-way disposed therein, a cam, a device adapted to follow said guide-way, a beam connected with said device, a sheave connected with said carriage, members connecting said beam and sheave, an arm normally retained in engagement with said cam, and a rod connecting said arm and blades, said guide-way adapted to reciprocate said device, said device adapted to reciprocate said beam, said members adapted to impart the movement of said beam to said sheave, said cam adapted to periodically advance said blades, means to retract said blades, and mechanism for disengaging said arm and cam.

14. An agricultural implement comprising a frame, a carriage revolubly suspended from said frame, cutting blades hingedly connected with said carriage, a revoluble member, a guide-way disposed therein, a cam, a device adapted to follow said guide-way, a beam connected with said device, a sheave connected with said carriage, members connecting said beam and sheave, an arm normally retained in engagement with said cam, and a rod connecting said arm and blades, said guide-way adapted to reciprocate said device, said device adapted to reciprocate said beam, said members adapted to impart the movement of said beam to said sheave, said cam adapted to periodically advance said blades, means to retract said blades, and mechanism for disengaging said arm and cam.

15. An agricultural implement comprising a frame, a carriage revolubly suspended from said frame, cutting blades connected with said carriage, a revoluble member, a guide-way disposed therein, a cam, a device adapted to follow said guide-way, a beam connected with said device, a sheave connected with said carriage, members connecting said beam and sheave, an arm normally retained in engagement with said cam, a rod connecting said arm and blades, and means for raising said blades out of contact with the ground, said guide-way adapted to reciprocate said device, said device adapted to reciprocate said beam, said members adapted to impart the movement of said beam to said sheave, said cam adapted to periodically advance said blades, and means to retract said blades.

16. An agricultural implement comprising a frame, a carriage revolubly suspended from said frame, cutting blades hingedly connected with said carriage, a revoluble member, a guide-way disposed therein, a cam, a device adapted to follow said guide-way, a beam connected with said device, a sheave connected with said carriage, members connecting said beam and sheave, an arm normally retained in engagement with said cam, a rod connecting said arm and blades, and means for raising said blades out of contact with the ground, said guide-way adapted to reciprocate said device, said device adapted to reciprocate said beam, said members adapted to impart the movement of said beam to said sheave, said cam adapted to periodically advance said blades, and means to retract said blades.

THOS. H. ELLIS.

Witnesses:
J. CARTER CARSTENS,
W. C. NIESHATH.

Copies of this patent may be obtained for five cents each, by addressing the "Commissioner of Patents, Washington, D. C."